United States Patent
Wu et al.

(10) Patent No.: US 12,493,357 B2
(45) Date of Patent: Dec. 9, 2025

(54) METHOD FOR GESTURE MANIPULATION ON A DISPLAY AND HOST

(71) Applicant: HTC Corporation, Taoyuan (TW)

(72) Inventors: Meng-Ju Wu, Taoyuan (TW); Jia-Yau Shiau, Taoyuan (TW); Hsin-Yu Ho, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/732,636

(22) Filed: Jun. 4, 2024

(65) Prior Publication Data

US 2025/0370545 A1 Dec. 4, 2025

(51) Int. Cl.
*G06F 3/041* (2006.01)
*G06F 3/01* (2006.01)
*G06T 15/06* (2011.01)

(52) U.S. Cl.
CPC .............. *G06F 3/017* (2013.01); *G06T 15/06* (2013.01); *G06T 2200/24* (2013.01)

(58) Field of Classification Search
None
See application file for complete search history.

(56) References Cited

U.S. PATENT DOCUMENTS

2014/0223490 A1 8/2014 Pan et al.
2016/0188109 A1* 6/2016 Wang ................... G06F 3/0418
345/173

FOREIGN PATENT DOCUMENTS

TW 202326622 7/2023

OTHER PUBLICATIONS

"Office Action of Taiwan Counterpart Application", issued on Jan. 13, 2025, p. 1-p. 14.

* cited by examiner

*Primary Examiner* — Carl Adams
(74) *Attorney, Agent, or Firm* — JCIPRNET

(57) ABSTRACT

This disclosure provides a method for gesture manipulation on a display. The method includes: obtaining, through a camera, a hand image of a hand of a user; performing, by a processor, a hand tracking of the hand based on the hand image; performing, by the processor, a ray casting based on the hand tracking; obtaining, by the processor, a casting point on a screen of the display based on the ray casting; rendering, by the processor, a rendered point on the screen of the display based on the casting point and a projection matrix; and updating, by the processor, the projection matrix based on the casting point and the rendered point.

20 Claims, 5 Drawing Sheets

METHOD FOR GESTURE MANIPULATION ON A DISPLAY AND HOST

BACKGROUND

Technical Field

The disclosure relates to a method for gesture manipulation on a display; particularly, the disclosure relates to a method for gesture manipulation on a display and a host.

Description of Related Art

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

SUMMARY

The disclosure is direct to a method for gesture manipulation on a display and a host, so as to provide an intuitive and convenient way to render gestures of the user on a screen of a display utilizing ray casting.

In this disclosure, a method for gesture manipulation on a display is provided. The method includes: obtaining, through a camera, a hand image of a hand of a user; performing, by a processor, a hand tracking of the hand based on the hand image; performing, by the processor, a ray casting based on the hand tracking; obtaining, by the processor, a casting point on a screen of the display based on the ray casting; rendering, by the processor, a rendered point on the screen of the display based on the casting point and a projection matrix; and updating, by the processor, the projection matrix based on the casting point and the rendered point.

In this disclosure, a host is provided. The host includes a storage circuit and processor. The storage circuit is configured to store a program code. The processor is coupled to the storage circuit. The processor is configured to access the program code to execute: obtaining, through a camera, a hand image of a hand of a user; performing a hand tracking of the hand based on the hand image; performing a ray casting based on the hand tracking; obtaining a casting point on a screen of a display based on the ray casting; rendering a rendered point on the screen of the display based on the casting point and a projection matrix; and updating the projection matrix based on the casting point and the rendered point.

Based on the above, according to the method for gesture manipulation on a display and the host, gestures of the user may be rendered on a screen of a display utilizing only one single camera.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
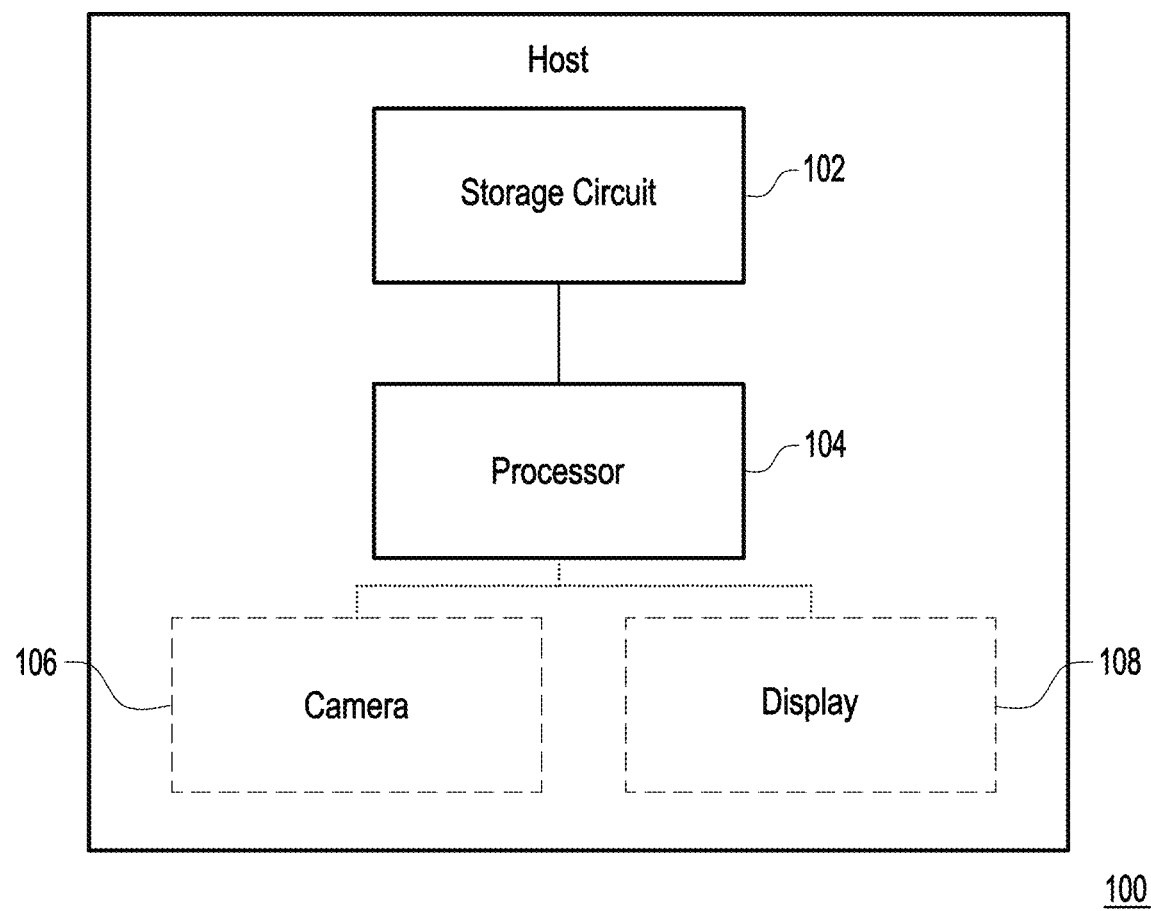
FIG. 1 is a schematic diagram of a host according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

Hand tracking is a common technology for enabling natural user interaction in XR environments. To provide a high-quality user experience, hand tracking systems typically require depth cameras or multiple cameras for accurate tracking. However, in most situations, lots of electronic devices (e.g., computer, tablet, TV . . . etc.) do not come equipped with depth cameras or multiple cameras. As a result, it is difficult to achieve accurate ray casting of gestures on the displays of these electronic devices based on hand tracking.

It is worth noting that, a projection matrix may be used to convert three-dimensional (3D) coordinates to two-dimensional (2D) coordinates, which is essential for rendering 3D objects on a 2D screen. For example, an intrinsic matrix of a camera may be regarded as a type of a projection matrix. To be more specific, the intrinsic matrix of the camera defines a relationship between 3D points in the real world and their corresponding 2D image coordinates. In other words, the intrinsic matrix of the camera is used to convert points in a 3D space system world to a 2D pixel system on an image plane of the camera during the imaging process. However, displays of most electronic devices do not have an intrinsic matrix similar to that of a camera. That is to say, the absence of an intrinsic matrix in the displays of most electronic devices poses a challenge for accurately rendering gestures on screens of the displays of the electronic devices utilizing ray casting. For example, a user may intend to point to an interested target on a screen of a display an electronic device, but a rendered point (e.g., a cursor) on the screen based on the gesture of the user may be not correctly on the interested target.

Therefore, it is the pursuit of people skilled in the art to provide an intuitive and convenient way to render gestures of the user on screens of the displays of the electronic devices utilizing ray casting.

In this disclosure, a method for gesture manipulation on a display of an electronic device is proposed. By utilizing only one camera, a ray may be casted on a screen of the display based on an image of the hand of the user. Further, based on the ray, a casting point may be determined. Furthermore, a rendered point (e.g., a cursor) may be rendered based on the casting point and a projection matrix similar as the intrinsic matrix. Moreover, based on the casting point and the rendered point, the projection matrix similar as the intrinsic matrix may be updated. That is, an output result of a rendering process is fed back to change the rendering process to an input of the rendering process. Therefore, the above method may be referred to as a forward-feedback hand tracking method or an alignment algorithm for gesture manipulation and the above method may be able to reflect the user's intension on the screen of the displayer correctly. Further details of the method for gesture manipulation will be discussed below with respect to the accompanying drawings.

FIG. 1 is a schematic diagram of a host according to an embodiment of the disclosure. In various embodiments, a host 100 may be any smart device and/or computer device. In some embodiments, the host 100 may be a computer and/or a server, and the host 100 may provide the computed results to an external display device, such that the external display device can show the computed results to the user. However, this disclosure is not limited thereto.

In FIG. 1, the host 100 includes a storage circuit 102 and a processor 104. The storage circuit 102 is one or a combination of a stationary or mobile random access memory (RAM), read-only memory (ROM), flash memory, hard disk, or any other similar device, and which records a plurality of modules and/or a program code that can be executed by the processor 104.

The processor 104 may be coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In some embodiments, the host 100 may further include a camera 106 or the host 100 may be coupled to the camera 106. The camera 106 may be a complementary metal oxide semiconductor (CMOS) camera, a charge coupled device (CCD) camera, other similar devices, or a combination of these devices. It is noteworthy that, depth information is not required for the camera 106 to function. In other words, the camera 106 is not a depth-sensing camera.

In some embodiments, the host 100 may further include a display 108 or the host 100 may be coupled to the display 108. The display 108 may be an organic light-emitting diode (OLED) display device, a mini LED display device, a micro LED display device, a quantum dot (QD) LED display device, a liquid-crystal display (LCD) display device, a tiled display device, a foldable display device, an electronic paper display (EPD), other similar devices, or a combination of these devices.

In some embodiments, the host 100 may further include a communication circuit and the communication circuit may include, for example, a wired network module, a wireless network module, a Bluetooth module, an infrared module, a radio frequency identification (RFID) module, a Zigbee network module, or a near field communication (NFC) network module, but the disclosure is not limited thereto. That is, the host 100 may communicate with an external device (e.g., the camera 106, the display 108) through either wired communication or wireless communication.

In the embodiments of the disclosure, the processor 104 may access the modules and/or the program code stored in the storage circuit 102 to implement the method for gesture manipulation on a display provided in the disclosure, which would be further discussed in the following.

Figure 2:
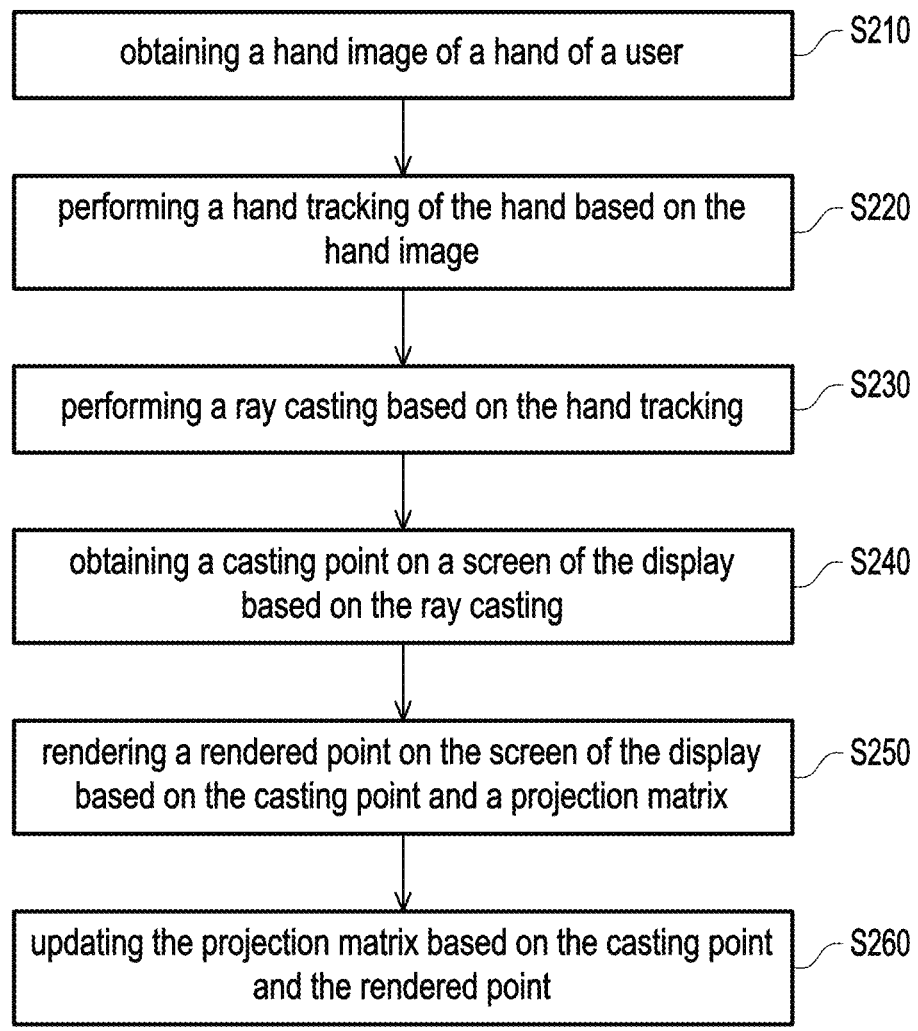
FIG. 2 is a schematic flowchart of a method for gesture manipulation on a display according to an embodiment of the disclosure.
Figure 3A:
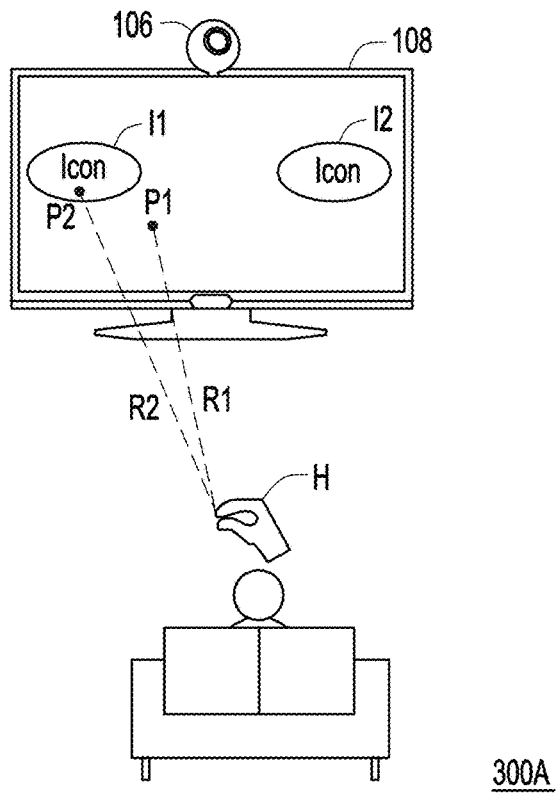
FIG. 3A is a schematic diagram of a gesture manipulation scenario according to an embodiment of the disclosure.

FIG. 2 is a schematic flowchart of a method for gesture manipulation on a display according to an embodiment of the disclosure. In FIG. 2, a method 200 for gesture manipulation on a display 108 of this embodiment may be executed by the host 100 in FIG. 1, and the details of each step in FIG. 2 will be described below with the components shown in FIG. 1. In addition, for better understanding the concept of this disclosure, FIG. 3A will be used as an example, wherein FIG. 3A shows an application scenario according to an embodiment of the disclosure. In FIG. 3A, a gesture manipulation scenario 300A includes a hand H of a user, the camera 106, the display 108, a casting ray R1, a casting point P1, a rendered ray R2, a rendered point P2, and an interested icon I1 and an uninterested icon I2 displayed on the screen of the display 108.

First, in a step S210, a hand image of the hand H of the user may be obtained through the camera 106. The camera 106 may be a built-in camera of the display 108, but this disclosure is not limited thereto. That is, an image plane of the camera 106 may be same as or parallel to a screen of the display 108.

Next, in a step S220, the processor 104 may be configured to perform a hand tracking of the hand H based on the hand image. That is, based on the hand image, a position and a posture of the hand H may be determined by the processor 104. It is noted that, during the hand tracking, the user may intend to point an interested target (e.g., the interested icon I1) on a screen of the display 108 to perform an operation, but this disclosure is not limited thereto.

Then, in a step S230, in order to reflect the user's intension on the display 108, the processor 104 may be configured to perform a ray casting based on the hand tracking. For example, a virtual ray, such as a casting ray R1, may be emitted from the hand H to the display 108. A direction of the casting ray R1 may be determined based on a direction of the hand H, but this disclosure is not limited thereto. For example, the direction of the hand H may include a direction of a wrist, a finger, a palm, or other reference point on the hand according to design needs.

Afterwards, in a step S240, a casting point P1 of the casting ray R1 on a screen of the display 108 may be obtained. For example, the casting point P1 may be an intersection point of the casting ray R1 and the screen of the display 108. It is noted that, only one camera 106 is used to obtain the hand image for the hand tracking and the camera 106 is not a depth camera. Further, the display 108 does not have a built-in intrinsic matrix. That is, although the casting point P1 may reflect the intension of the user correctly, but a rendering result (e.g., a cursor) of the casting point P1 on the screen of the display 108 may not be able to reflect the intension of the user correctly. For example, the rendering result may be the rendered point P2. In order to reflect the intension of the user correctly, a projection matrix similar as the intrinsic matrix may be utilized during the rendering process, which will be discussed below for further details.

In some embodiments, during the hand tracking, the user may intend to point an interested target on the screen of the display 108 to perform an operation. For example, the interested target may be the interested icon I1 on the screen and the user may intend to perform a click operation on the interested icon I1 utilizing the gesture manipulation. It is noted that, while the rendering point P2 is correctly on the icon I1 instead of on other objects on the screen (e.g., the uninterested icon I2), an initialization process or a calibration process of the projection matrix may be performed. However, this disclosure is not limited thereto.

In one embodiment, the user may perform a predetermined gesture on the interested icon I1 to activate the initialization process or the calibration process of the projection matrix. That is, the predetermined gesture performed by the user on the interested icon I1 (utilizing the rendered point P2 (e.g., cursor)) signifies the user's intention to carry out a specific operation on the interested icon I1. This implies that a current location of the rendered point P2 accurately reflects an intended pointing position of the user, although there may be an offset from the casting point P1 (i.e., where the user is actually pointing) to the rendered point P2 (i.e., what is actually shown on the screen). In other words, although the user is pointing to the screen of the display 108 through the casting ray R1, a rendering result may seem like that the user is pointing to the screen through the rendered ray R2.

That is, a gesture of the hand H may be determined by the processor 104 based on the hand tracking. Further, the processor 104 may be configured to determine whether the rendered point P2 is on an icon (e.g., the interested icon I1). Furthermore, in response to that the gesture is a predetermined gesture being determined and the rendered point P2 being on the icon, the processor 104 may be configured to update the projection matrix. However, this disclosure is not limited thereto.

In other words, once an operation (e.g., click operation) on an icon (e.g., the interested icon I1) is triggered by the predetermined gesture, a current location of the rendered point P2 may be interpreted as the user's interested target. Therefore, the current location of the rendered point P2 may be utilized to update the projection matrix. Moreover, a relative position between the casting point P1 and the rendered point P2 and a location of the interested icon I1 may be stored as "history manipulation information" in the storage circuit 102. The history manipulation information may be utilized to determine the projection matrix for a next rendering process. However, this disclosure is not limited thereto.

Further, in a step S250, without the help of a built-in intrinsic matrix of the display 108, the processor 104 may be configured to render the rendered point P2 on the screen of the display 108 based on the casting point P1 and the projection matrix. As described above, the projection matrix may be predetermined based on a previous operation with respect to an icon. However, this disclosure is not limited thereto. On the other hand, while there is no previous operation, the projection matrix may be a default matrix determined by the processor 104 based on parameters of the display 108. For example, the projection matrix may include a scale factor and a principle point. The scale factor of the projection matrix may be determined based on a size and/or a resolution of the screen of the display 108 and the principle point of the projection matrix may be determined based on a center point of the screen of the display 108. However, this disclosure is not limited thereto.

It is noteworthy that, a purpose of the projection matrix is converting a 3D coordinate (e.g., casting point P1) to a 2D coordinate (e.g., rendering point P2), which is essential for rendering 3D objects on a 2D screen. However, since the display 108 does not have an intrinsic matrix that can be used as a projection matrix, as shown in FIG. 3A, a misalignment may occur between the casting point P1 and the rendered point P2 during the rendering process. That is, when the user attempts to point to the casting point P1, a cursor may appear at the rendered point P2 instead of at the casting point P1. In other words, the rendering process may cause a misalignment between the casting point P1 and the rendered point P2. In this disclosure, the misalignment may be used to update the default projection matrix by forward feedbacking the misalignment back to the projection matrix. In other words, the process of determining or updating the projection matrix may be referred to an alignment algorithm of the gesture manipulation.

In a step S260, in order to eliminate the positional mismatch between the casting point and the render point, the processor 104 may be configured to update the projection matrix based on the casting point P1 and the rendered point P2. For example, the projection matrix may be updated based on a relative position between the casting point P1 and the rendered point P2 and a location of the interested icon I1. In other words, parameters (e.g., the principle point, the scale factor) of the projection matrix may be adjusted based on the casting point P1 and the rendered point P2 to make sure that the casting point P1 is aligned with the rendered point P2. However, this disclosure is not limited thereto.

In one embodiment, after the rendering process, the relative position between the casting point P1, the rendered point P2, and/or a location of the interested icon I1 may be stored as the history manipulation information in the storage circuit 102. For a next rendering process, the projection matrix may be determined based on the history manipulation information (e.g., the relative position). That is, the processor 104 may be configured to update the projection matrix based on the relative position and utilized the updated projection matrix for the rendering process. In this manner, the method 200 may allow the rendered point P2 to accurately track the user's gestures for gesture manipulation on the displayer 108 even with only one single camera 106.

Figure 3B:
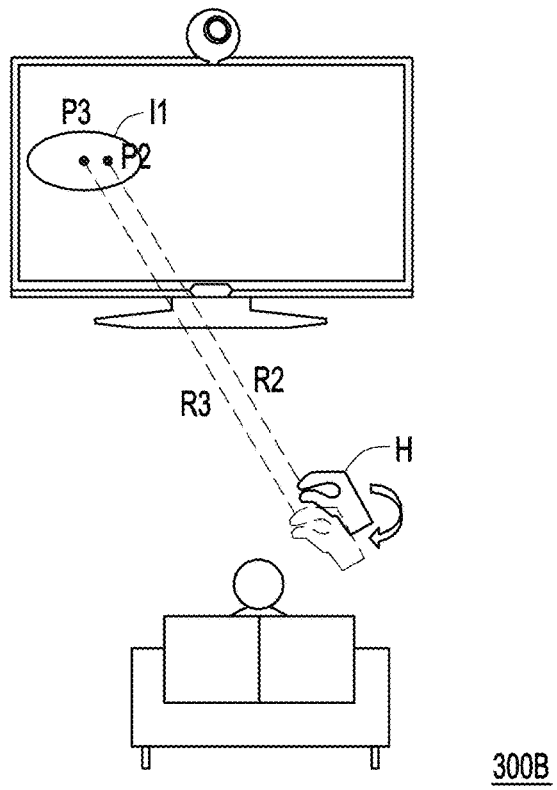
FIG. 3B is a schematic diagram of a gesture manipulation scenario according to an embodiment of the disclosure.

FIG. 3B is a schematic diagram of a gesture manipulation scenario according to an embodiment of the disclosure. In FIG. 3B, a gesture manipulation scenario 300B includes the hand H of the user, the rendered ray R2, the rendered point P2, an optimized ray R3, an optimized point P3, and the interested icon I1.

With reference to FIG. 3B, after the rendering process, the rendered point P2 may be further optimized based on a relationship between the rendered point P2 and the interested icon I1. For example, the user may intend to point to a center point of the interested icon I1. However, due to an error in the rendering process or an incorrect gesture, the rendering point P2 may not be perfectly on the center point of the interested icon I1. In such circumstances, if a distance between the rendered point P2 and center point of the interested icon I1, the rendered point P2 may be automatically optimized to an optimized point P3 as a new rendered point P2. The optimized point P3 may be right on the center point of the interested icon I1. That is, although an initial rendering result may seem like that the user is pointing to the screen through the rendered ray R2, an optimized rendering result may seem like that the user is pointing to the screen through the optimized ray R3.

In other words, in response to that a distance between the rendered point (i.e., P2) and the icon I1 is smaller than a threshold distance being determined, the processor 104 may be configured to determine that the rendered point P2 is on the interested icon I1. In one embodiment, the distance between rendered point P2 and the interested icon I1 may be defined as a distance between the rendered point P2 and a center point of the icon I1. However, this closure is not limited thereto.

In this manner, the user may interact with icons by simply hovering the cursor nearby, thereby enhancing the user experience.

Figure 4:
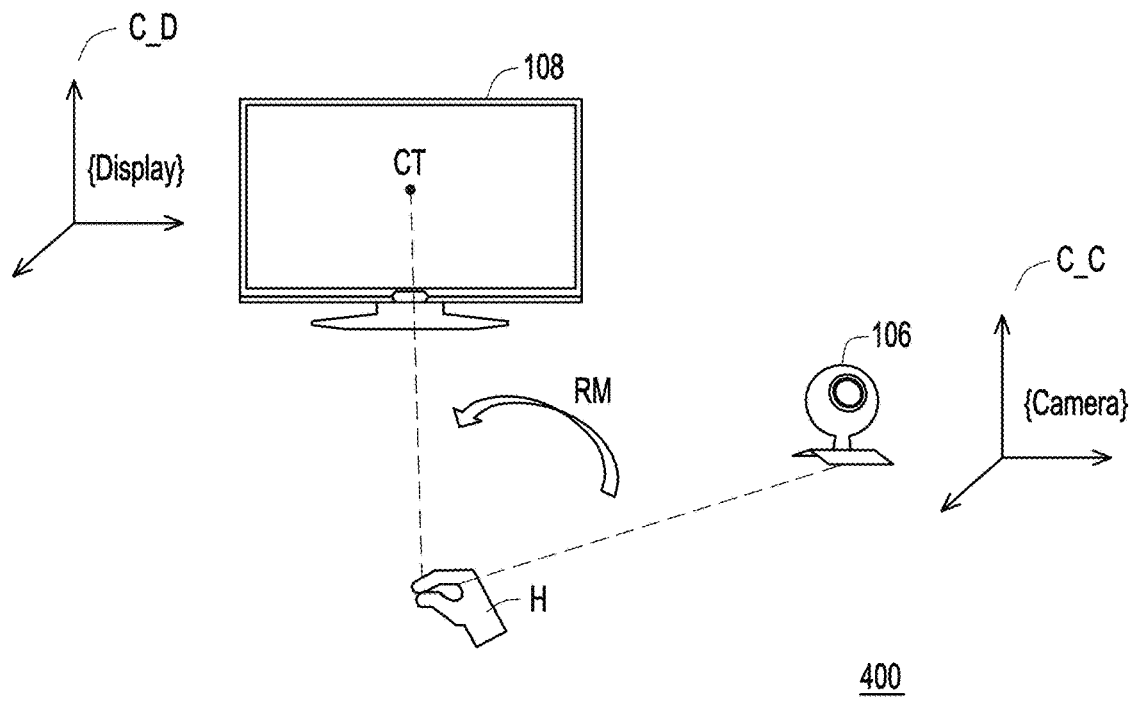
FIG. 4 is a schematic diagram of a gesture manipulation scenario according to an embodiment of the disclosure.

FIG. 4 is a schematic diagram of a gesture manipulation scenario according to an embodiment of the disclosure. In FIG. 4, a gesture manipulation scenario 400 includes the camera 106 and the display 108.

It is worth mentioned that, in this embodiment, the camera 106 may be not a built-in camera of the display 108. That is, an image plane of the camera 106 may be not same as or not parallel to a screen of the display 108. In other words, the camera 106 and the display 108 may be not in a same coordinate system. For example, the camera 106 may be in a camera coordinate system C_C and the display 108 may be in a display coordinate system C_D.

To transform the camera 106 and the display 108 into the same coordinate system, a rotation matrix RM may be applied. That is, the rotation matrix RM may be used to map a coordinate of a point from the camera coordinate system C_C to the s display coordinate system C_D by multiplying the coordinate of point by the rotation matrix RM. For example, a center point of the camera 106 may be mapped to a center point CT of the screen of the display 108. This process may be referred to as a "re-center process". In this manner, even if the display 108 does not have a built-in camera, the user may still perform gesture manipulation on the screen of the display 108 utilizing an external camera, thereby enhancing the user experience.

In one embodiment, a re-center gesture may be predefined and stored in the storage circuit 102. When the re-center gesture is detected, the processer 104 may be configured to perform the re-center process.

In addition, the re-center process may be applied to not only an external camera, but also a built-in camera of the display 108. For example, when the gesture manipulations on the display 108 are not working properly, the user may manually re-center the camera 106 to correct the problem. That is, the camera 106 may be re-centered to make sure the principle point of the projection matrix is aligned with the center point CT in the center of the screen of the display 108. However, this disclosure is not limited thereto.

Figure 5:
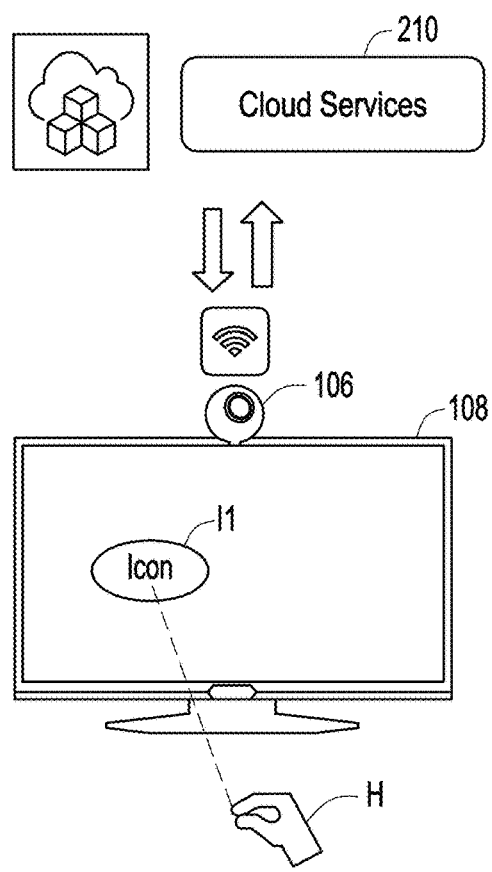
FIG. 5 is a schematic diagram of a gesture manipulation scenario according to an embodiment of the disclosure.

FIG. 5 is a schematic diagram of a gesture manipulation scenario according to an embodiment of the disclosure. In FIG. 5, a gesture manipulation scenario 500 may include the camera 106, the display 108, and cloud services 210 provide by a server.

In one embodiment, the processor 104 may be included in a cloud server and the cloud server may be configured to communicate with the camera 106 and the display 108 through either wired communication or wireless communication. That is, no matter how much a computing power of a user device is, the user is still able to perform the gesture manipulation on the display 108. Moreover, by using the cloud services provided by the cloud server, there is no need to install any specific software to perform the gesture manipulation. In this manner, the user experience may be improved.

Figure 6:
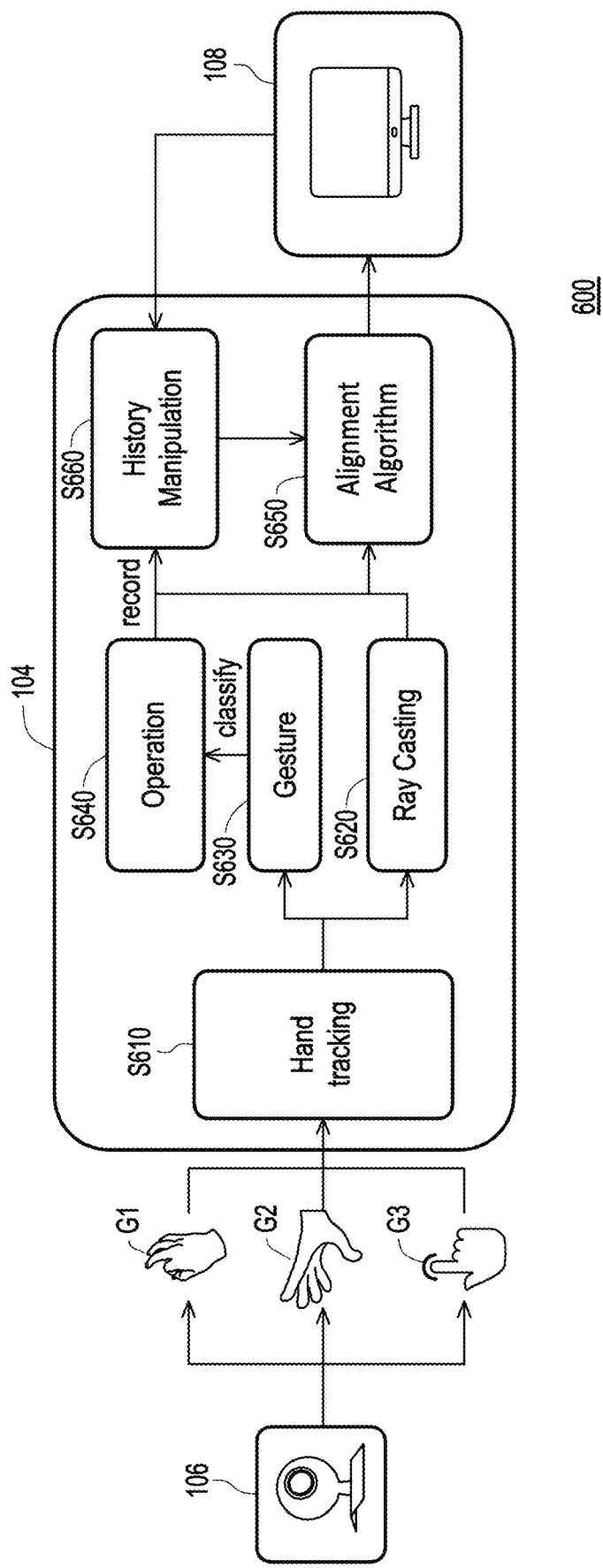
FIG. 6 is a schematic flowchart of a method for gesture manipulation on a display according to an embodiment of the disclosure.

FIG. 6 is a schematic flowchart of a method for gesture manipulation on a display according to an embodiment of the disclosure. In FIG. 6, a method 600 for gesture manipulation on a display 108 of this embodiment may be executed by the host 100 in FIG. 1, and the details of each step in FIG. 6 will be described below with the components shown in FIG. 1.

With reference to FIG. 6, the camera 106 may be configured to obtain the hand image of the hand H. For example, the user may perform different gestures (e.g. gesture G1, gesture G2, gesture G3) and these different gestures may correspond to different operations. Further, the camera 106 may be configured to capture the hand image of the hand H with one of the gestures and provide the hand image to the processor. Based on the hand image, the processor 104 may be configured to execute a program code to perform a gesture manipulation. Furthermore, based on a computed result from the processor 104, the display 108 may be configured to display a result of the gesture manipulation on the screen of the display 108. Therefore, the gesture manipulation may be achieved. Further details of the method 600 will be discussed step by step below with the steps shown in FIG. 6.

In a step S610, the processor 104 may be configured to perform a hand tracking of the hand H based on the hand image. Based on a result of the hand tracking, a gesture of the hand H may be determined and a virtual ray may be casted. For example, in a step S620, the processor 104 may be configured to perform a ray casting based on the hand tracking. On the other hand, in a step S630, the processor 104 may be configured to determine a gesture of the hand H based on the hand tracking. That is, a hand tracking result of the hand tracking may be not only used to determine a casting point P1 as shown in FIG. 3A based on the ray casting, but also used to determine the gesture of the hand H.

Next, in a step S640, the gesture of the hand H may be classified by the processor to determine an operation. That is, each gesture may respectively correspond to an operation. For example, the operation may include at least one of moving an object (e.g. the interested icon I1 in FIG. 3A), clicking the object, and selecting the object. However, this disclosure is not limited thereto.

Then, In a step S650, an alignment algorithm of the gesture manipulation may be performed on the result of the ray casting to decrease the misalignment between the casting point P1 and the rendered point P2 as shown in FIG. 3A. That is, the alignment algorithm may be configured to update projection matrix for rendering the casting point P1 to the rendered point P2.' Therefore, the casting point P1 may be aligned with the rendered point P2 after the rendering process.

Further, in a step 660, a relative position between the casting point P1 and the rendered point P2 and/or a location of the interested icon I1 may be stored as the history manipulation information in the storage circuit 102. The history manipulation information may be utilized to determine the projection matrix for a next rendering process. In addition, when there is no projection matrix, the display 108 may provide parameters of the display 108 (e.g., the size and/or resolution of the screen, a coordinate of a central point of the screen . . . etc.) to the processor 104 for determining parameters of the projection matrix. Therefore, the method 600 is a forward-feedback method, which may increase an accuracy of the rendering.

In summary, according to the method for gesture manipulation on a display and the display, the user may still perform gesture manipulation on the screen of the display 108 utilizing only one camera 106. Further, the method may be performed from a could server and therefore a requirement of a computing power of the user device is decreased. Furthermore, the rendering result may be used to keep updating the projection matrix to increase the accuracy of the rendering process. In this manner, the user experience may be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for gesture manipulation on a display, comprising:
    obtaining, through a camera, a hand image of a hand of a user;
    performing, by a processor, a hand tracking of the hand based on the hand image;
    performing, by the processor, a ray casting based on the hand tracking;
    obtaining, by the processor, a casting point on a screen of the display based on the ray casting;
    rendering, by the processor, a rendered point on the screen of the display based on the casting point and a projection matrix;
    storing, in a storage circuit, a relative position between the casting point and the rendered point as history manipulation information; and
    updating, by the processor, the projection matrix based on the relative position between the casting point and the rendered point.

2. The method according to claim 1, further comprising:
    determining a gesture of the hand based on the hand tracking;
    determining that whether the rendered point is on an icon on the screen; and
    in response to determining that the gesture is a predetermined gesture and the rendered point is on the icon, updating the projection matrix.

3. The method according to claim 1, further comprising:
    determining the projection matrix based on the relative position.

4. The method according to claim 1, further comprising:
    determining a virtual ray of the ray casting based on a direction of the hand, wherein the casting point is an intersection point of the virtual ray and the screen.

5. The method according to claim 1, further comprising:
    in response to determining that a distance between the rendered point and an icon is smaller than a threshold distance, determining that the rendered point is on the icon.

6. The method according to claim 1, further comprising:
    determining a scale factor of the projection matrix based on a size of the screen.

7. The method according to claim 1, further comprising:
    determining a principle point of the projection matrix based on a center point of the screen.

8. The method according to claim 1, wherein an image plane of the camera is same as or parallel to a screen of the display.

9. The method according to claim 1, wherein an image plane of the camera is not same as or parallel to a screen of the display and the method further comprises:
    determining a rotation matrix based on the camera and the display.

10. The method according to claim 1, wherein the processor is comprised in a server and the server is configured to communicate with the camera and the display through either wired communication or wireless communication.

11. A host, comprising:
    a storage circuit, configured to store a program code; and
    a processor, coupled to the storage circuit and configured to access the program code to execute:
        obtaining, through a camera, a hand image of a hand of a user;
        performing a hand tracking of the hand based on the hand image;
        performing a ray casting based on the hand tracking;
        obtaining a casting point on a screen of a display based on the ray casting;
        rendering a rendered point on the screen of the display based on the casting point and a projection matrix;
        storing, in the storage circuit, a relative position between the casting point and the rendered point as history manipulation information; and
        updating the projection matrix based on the relative position between the casting point and the rendered point.

12. The host according to claim 11, wherein the processor is further configured to access the program code to execute:
    determining a gesture of the hand based on the hand tracking;
    determining that whether the rendered point is on an icon on the screen; and
    in response to determining that the gesture is a predetermined gesture and the rendered point is on the icon, updating the projection matrix.

13. The host according to claim 11, wherein the processor is further configured to access the program code to execute:
    determining the projection matrix based on the relative position.

14. The host according to claim 11, wherein the processor is further configured to access the program code to execute:
    determining a virtual ray of the ray casting based on a direction of the hand, wherein the casting point is an intersection point of the virtual ray and the screen.

15. The host according to claim 11, wherein the processor is further configured to access the program code to execute:
    in response to determining that a distance between the rendered point and an icon is smaller than a threshold distance, determining that the rendered point is on the icon.

16. The host according to claim 11, wherein the processor is further configured to access the program code to execute:
    determining a scale factor of the projection matrix based on a size of the screen.

17. The host according to claim 11, wherein the processor is further configured to access the program code to execute:
    determining a principle point of the projection matrix based on a center point of the screen.

18. The host according to claim 11, wherein an image plane of the camera is same as or parallel to a screen of the display.

19. The host according to claim 11, wherein an image plane of the camera is not same as or parallel to a screen of the display and the processor is further configured to access the program code to execute:
    determining a rotation matrix based on the camera and the display.

20. The host according to claim 11, wherein the processor is comprised in a server and the server is configured to communicate with the camera and the display through either wired communication or wireless communication.

* * * * *